US008682061B2

(12) United States Patent
Matsui

(10) Patent No.: US 8,682,061 B2
(45) Date of Patent: Mar. 25, 2014

(54) STEREOSCOPIC IMAGE EDITING APPARATUS AND STEREOSCOPIC IMAGE EDITING METHOD

(75) Inventor: Norihiro Matsui, Osaka (JP)

(73) Assignee: Panasonic Corporation, Osaka (JP)

(*) Notice: Subject to any disclaimer, the term of this patent is extended or adjusted under 35 U.S.C. 154(b) by 80 days.

(21) Appl. No.: 13/058,263

(22) PCT Filed: May 13, 2010

(86) PCT No.: PCT/JP2010/003255
§ 371 (c)(1),
(2), (4) Date: Feb. 22, 2012

(87) PCT Pub. No.: WO2011/024352
PCT Pub. Date: Mar. 3, 2011

(65) Prior Publication Data
US 2012/0139900 A1 Jun. 7, 2012

(30) Foreign Application Priority Data
Aug. 25, 2009 (JP) ................................ 2009-194803

(51) Int. Cl.
*G06K 9/00* (2006.01)
(52) U.S. Cl.
USPC .......................................... 382/154; 345/419
(58) Field of Classification Search
USPC ............. 345/419; 382/154; 348/42; 359/462, 359/466, 467, 470–473; 353/6
See application file for complete search history.

(56) References Cited

U.S. PATENT DOCUMENTS

| 6,108,005 A * | 8/2000 | Starks et al. ................... 345/419 |
| 7,773,799 B2 * | 8/2010 | Oldroyd ......................... 382/154 |
| 2002/0008906 A1 * | 1/2002 | Tomita ........................... 359/462 |
| 2002/0141635 A1 * | 10/2002 | Swift et al. ...................... 382/154 |
| 2008/0158346 A1 * | 7/2008 | Okamoto et al. ............... 348/47 |

FOREIGN PATENT DOCUMENTS

| JP | 8-317429 | 11/1996 |
| JP | 2001-326947 | 11/2001 |
| JP | 2004-343290 | 12/2004 |
| JP | 2005-130310 | 5/2005 |
| JP | 2006-33228 | 2/2006 |

OTHER PUBLICATIONS

International Search Report issued Aug. 17, 2010 in corresponding International Application No. PCT/JP2010/003255.

* cited by examiner

Primary Examiner — Xiao M. Wu
Assistant Examiner — Steven Elbinger
(74) Attorney, Agent, or Firm — Wenderoth, Lind & Ponack, L.L.P.

(57) ABSTRACT

A stereoscopic image editing apparatus and method, in which a stereoscopic image having a stereoscopic effect desired by the user can be obtained, are provided. The stereoscopic image editing apparatus includes a storage section for storing the stereoscopic image, a compression/decompression section for converting the stereoscopic image to a format displayable on a display, an operation section for allowing the user to specify a crop-edit region and set the fiducial disparity, which is the disparity of the frame of the crop-edit region, with respect to a left-eye and a right-eye images of the stereoscopic image, and a cropping and editing section for cropping and editing the left-eye and the right-eye images of the stereoscopic image, based on the crop-edit region, and a crop-edit region correcting section for correcting the crop-edit region, based on the fiducial disparity with respect to the cropped and edited left-eye and right-eye images.

7 Claims, 12 Drawing Sheets

F I G. 7

| AMOUNT OF DISPARITY | LEFT-EYE IMAGE | | RIGHT-EYE IMAGE | |
|---|---|---|---|---|
| | COORDINATES AT LEFTMOST END | COORDINATES AT RIGHTMOST END | COORDINATES AT LEFTMOST END | COORDINATES AT RIGHTMOST END |
| 0.0 mm | (56, 120) | (1750, 120) | (70, 120) | (1764, 120) |
| 1.0 mm | (58, 120) | (1748, 120) | (70, 120) | (1760, 120) |
| 2.0 mm | (50, 120) | (1750, 120) | (70, 120) | (1770, 120) |
| 3.0 mm | (50, 120) | (1730, 120) | (90, 120) | (1770, 120) |
| 4.0 mm | (50, 120) | (1720, 120) | (100, 120) | (1770, 120) |
| ⋮ | ⋮ | ⋮ | ⋮ | ⋮ |

CROPPED AND EDITED STEREOSCOPIC IMAGE

F I G. 1 0
CROPPED AND EDITED STEREOSCOPIC IMAGE
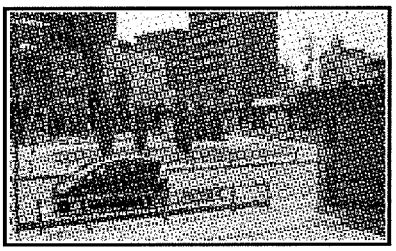
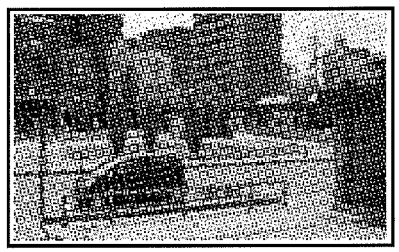
CORRECTED RIGHT-EYE
CROP-EDIT REGION IMAGE 14
CORRECTED LEFT-EYE
CROP-EDIT REGION IMAGE 13

FIG. 12
CROPPED AND EDITED STEREOSCOPIC IMAGE
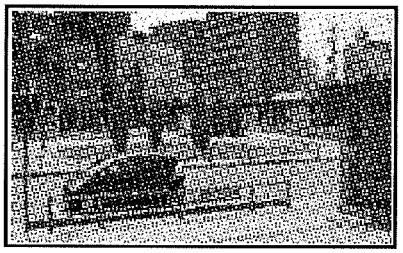
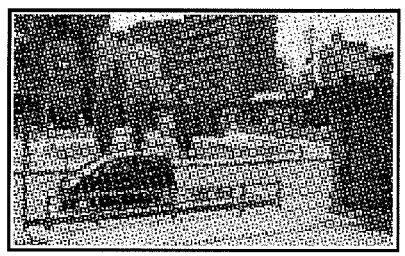
CORRECTED RIGHT-EYE
CROP-EDIT REGION IMAGE 14
CORRECTED LEFT-EYE
CROP-EDIT REGION IMAGE 13

STEREOSCOPIC IMAGE EDITING APPARATUS AND STEREOSCOPIC IMAGE EDITING METHOD

TECHNICAL FIELD

The present invention relates to a stereoscopic image editing apparatus and a stereoscopic image editing method for editing a stereoscopic image having a disparity, which is composed of a plurality of images, and more particularly, to a stereoscopic image editing apparatus and a stereoscopic image editing method for editing the stereoscopic image to display on a display a stereoscopic image having a stereoscopic effect desired by a user.

BACKGROUND ART

By using a left-eye image equivalent to a field of view as seen from a left eye, and a right-eye image equivalent to a field of view as seen from a right eye, the left-eye image is projected to the left eye alone, and the right-eye image is projected to the right eye alone. Because of its binocular disparity, the user can obtain the stereoscopic effect from the stereoscopic image which is composed of the left-eye image and the right-eye image.

Since the stereoscopic image reproduces the disparity, which occurs between two human eyes, at least a camera for acquiring the left-eye image and a camera for acquiring the right-eye image are disposed side by side in a horizontal direction for concurrently capturing the same field of view, and thus, the stereoscopic image is created. In addition, a method exists that generates a 3D virtual space by using a computer so as to virtually achieve the same method described above, and generate a stereoscopic image from which the same effect can be obtained.

Stereoscopic images include not only still images, such as pictures, but also moving images, and are utilized for movies or the like which display a subject stereoscopically. Also, stereoscopic videos by use of a stereo video are becoming popular as a next generation method for providing audiovisual content.

As described above, stereoscopic image displaying technology has been widely used and further, it is conceived that not only a captured stereoscopic image is viewed without alternation, but some region of the captured stereoscopic image is cropped and edited.

As conventional stereoscopic image editing technology, there is a method in which a user specifies a crop-edit region of a left-eye image and a right-eye image of a stereoscopic image displayed on a display to crop and edit some region of the stereoscopic image. A user can use, for example, a same coordinate selection method or a feature point search and match method, as a method for specifying the crop-edit region.

The same coordinate selection method, if a crop-edit region is specified in one image (e.g., the left-eye image), selects a region in another image (the right-eye image) at the same coordinates of the specified crop-edit region, as a crop-edit region.

The feature point search and match method divides an image into small rectangular regions to determine an area correlation of each divided rectangular region, or the like, search the same feature points in the left-eye image and the right-eye image, and match the feature points with each other. When a crop-edit region is specified in one image (e.g., the left-eye image), a region, in another image (the right-eye image), that matches the crop-edit region specified in the left-eye image, is selected as a crop-edit region, based on the same feature point with that of the left-eye image. Patent Literature 1 discloses a stereoscopic image display apparatus which allows a user to easily view a stereoscopic image.

As described above, by specifying the crop edit regions desired by the user in the left-eye image and the right-eye image of the stereoscopic image displayed on the display, the user can crop and edit the some region of the captured stereoscopic image.

CITATION LIST

Patent Literature

[Patent Literature 1] Japanese Laid-Open Patent Publication No. 2001-326947

SUMMARY OF THE INVENTION

Problems to be Solved by the Invention

The user cannot set a fiducial disparity, for the crop-edit region of the stereoscopic image, which is a disparity of a frame itself of the crop-edit region and therefore, a desired depth cannot be provided in the display area of the stereoscopic image, namely, the stereoscopic image having a stereoscopic effect desired by the user cannot be obtained.

Specifically, in the case where a display area of the stereoscopic image is reduced such as in the case where an angle of view itself of the stereoscopic image is small, or in the case where the stereoscopic image is displayed in small size as a sub-screen of picture-in-picture mode, or the like, the frame of the display area becomes an object of the stereoscopic vision. Therefore, the user can feel difference in depth even between a subject present in the stereoscopic image and the frame of the display area of the stereoscopic image. However, a setting cannot be made to provide the image with depth toward the back of the display screen, with the assumption that the frame of the crop-edit region specified by the user is frontmost relative to an image in the crop-edit region. Furthermore, a setting cannot be made to display the subject as if jumping out toward the front side relative to the frame of the crop-edit region, with the assumption that the frame of the crop-edit region specified by the user is farthest away relative to the display screen.

Therefore, an object of the present invention is to provide a stereoscopic image editing apparatus and a stereoscopic image editing method which allows the user to set a fiducial disparity for a frame itself of the specified crop-edit region, which is a disparity of the frame itself of the crop-edit region, thereby providing a desired depth in the display region of the stereoscopic image and as a result, a stereoscopic image having a stereoscopic effect desired by the user can be obtained.

Solution to the Problems

In order to achieve the above-described objective, a stereoscopic image editing apparatus of the present invention for editing a stereoscopic image composed of a left-eye image and a right-eye image displayed on a display into a stereoscopic image having a stereoscopic effect desired by a user, the stereoscopic image editing apparatus including: a storage section for storing therein the stereoscopic image; a compression/decompression section for converting the stereoscopic image stored by the storage section to a format displayable on the display; an operation section for allowing the user to specify a crop-edit region, and set a fiducial disparity, which is a disparity of a frame itself of the crop-edit region, with respect to the left-eye image and the right-eye image of the stereoscopic image which are displayed on the display; a cropping and editing section for cropping and editing the left-eye image and the right-eye image of the stereoscopic image which are displayed on the display, based on the crop-edit region specified by the user; and a crop-edit region correcting section for correcting the crop-edit region with respect to the cropped and edited left-eye image and the cropped and edited right-eye image, based on the fiducial disparity set by the user.

Preferably, the operation section allows the user to directly set the fiducial disparity, or the operation section allows the user to specify a feature point within the crop-edit region with respect to the cropped and edited left-eye image and the cropped and edited right-eye image, and a disparity of the feature points is assumed to be the fiducial disparity.

Preferably, the crop-edit region correcting section detects a feature point at a leftmost end and a feature point at a rightmost end from among feature points, within the crop-edit region, which have the same disparity as the fiducial disparity set by the user, and corrects a left end and a right end of the crop-edit region to a position of the detected feature point at the leftmost end and a position of the detected feature point at the rightmost end, respectively.

More preferably, the crop-edit region correcting section detects, with respect to at least one or more predetermined disparities, a feature point at a leftmost end and a feature point at a rightmost end from among feature points, within the crop-edit region, which have the predetermined disparity, generates a candidate crop-edit region correction table in which the predetermined disparity is associated with a position of the detected feature point at the leftmost end, and a position of the detected feature point at the rightmost end, and corrects a left end and a right end of the crop-edit region to a position of the feature point at leftmost end and a position of the feature point at rightmost end, respectively, which are associated, in the candidate crop-edit region correction table, with the same disparity as the fiducial disparity set by the user.

In order to achieve the above-described objectives, the stereoscopic image editing method of the present invention is executed by the stereoscopic image editing apparatus for editing the stereoscopic image composed of the left-eye image and the right-eye image displayed on the display into the stereoscopic image having the stereoscopic effect desired by a user, the stereoscopic image editing method including: a compression/decompression step of converting a stereoscopic image, which is to be edited, into a format displayable on the display; a crop-edit region specifying step of specifying a crop-edit region with respect to a left-eye image and a right-eye image of the stereoscopic image which are displayed on the display; a cropping and editing step of cropping and editing the left-eye image and the right-eye image of the stereoscopic image which are displayed on the display, based on the specified crop-edit region; a fiducial disparity setting step of setting, with respect to the cropped and edited left-eye image and the cropped and edited right-eye image, a fiducial disparity which is a disparity of a frame itself of the crop-edit region; a crop-edit region correcting step of correcting the crop-edit region, based on the set fiducial disparity; and an edited image saving step of saving in the stereoscopic image editing apparatus the left-eye image and the right-eye image which have been cropped and edited in the corrected crop-edit region.

Preferably, the fiducial disparity setting step allows a user to directly set the fiducial disparity, or the fiducial disparity setting step allows the user to specify, with respect to the cropped and edited left-eye image and the cropped and edited right-eye image, a feature point within the crop-edit region, and a disparity of the feature points is assumed to be the fiducial disparity.

Preferably, the crop-edit region correcting step detects a feature point at a leftmost end and a feature point at a rightmost end from among feature points, within the crop-edit region, which have the same disparity as the set fiducial disparity, and corrects a left end and a right end of the crop-edit region to a position of the detected feature point at the leftmost end and a position of the detected feature point at the rightmost end, respectively.

More preferably, the crop-edit region correcting step detects, with respect to at least one or more predetermined disparities, a feature point at a leftmost end and a feature point at rightmost end from among feature points, within the crop-edit region, which have the predetermined disparity, generates a candidate crop-edit region correction table in which the predetermined disparity is associated with a position of the detected feature point at the leftmost end, and a position of the detected feature point at the rightmost end, and corrects a left end and a right end of the crop-edit region to a position of the feature point at the leftmost end and a position of the feature point at the rightmost end, respectively, which are associated, in the candidate crop-edit region correction table, with the same disparity as the set fiducial disparity.

The stereoscopic image editing method of the present invention described above is provided in a form of a program which causes a computer to execute a series of process steps. This program may be installed in a computer in the form of being stored in a computer readable storage medium.

Advantageous Effects of the Invention

According to a stereoscopic image editing apparatus and a stereoscopic image editing method of the present invention, a user is allowed to set a fiducial disparity for a frame itself of the specified crop-edit region, which is a disparity of the frame itself of the crop-edit region, thereby providing a desired depth in the display area of the stereoscopic image and as a result, a stereoscopic image having a stereoscopic effect desired by the user can be obtained.

BRIEF DESCRIPTION OF THE DRAWINGS

FIG. 7 is a diagram showing a candidate crop-edit region correction table 700.

FIG. 10 is a diagram showing the stereoscopic images cropped and edited in the corrected crop-edit region shown in FIG. 9.

FIG. 12 is a diagram showing the stereoscopic images cropped and edited in the corrected crop-edit region shown in FIG. 11.

DESCRIPTION OF EMBODIMENTS

Hereinafter, description is given of embodiments of the present invention, with reference to the accompanying drawings.

First Embodiment

Figure 1:
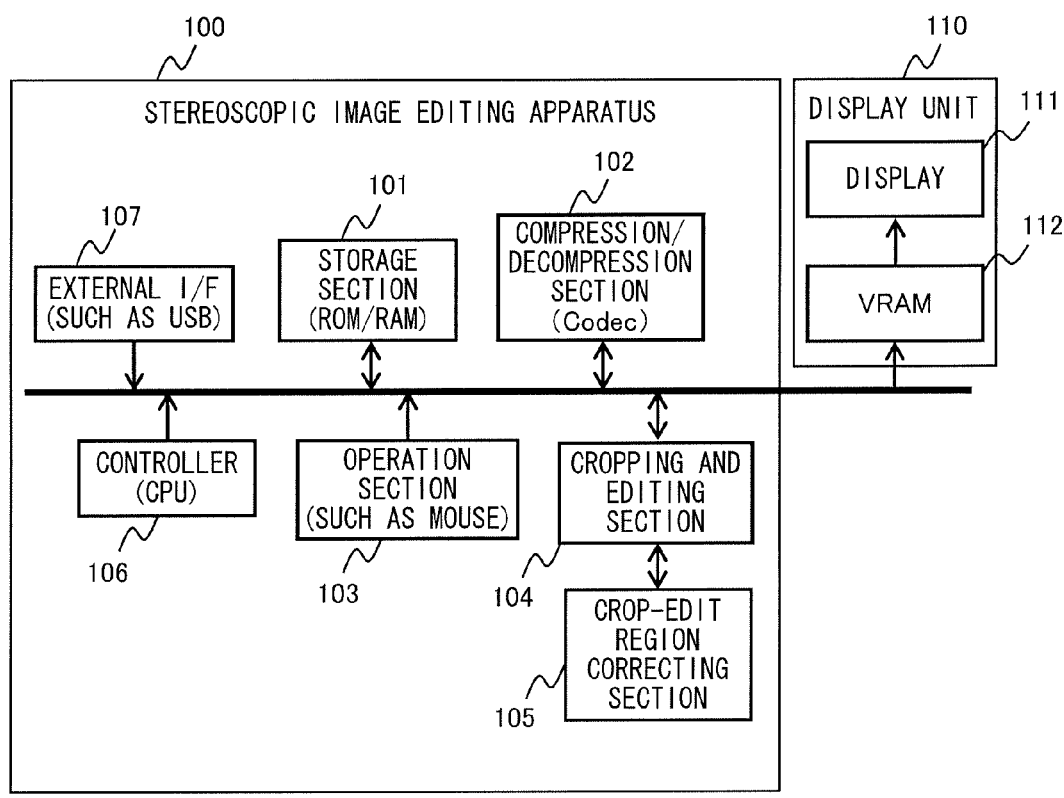
FIG. 1 is a hardware block diagram showing a schematic configuration of a stereoscopic image editing apparatus 100 according to a first embodiment of the present invention.

FIG. 1 is a hardware block diagram showing a schematic configuration of a stereoscopic image editing apparatus 100 according to a first embodiment of the present invention. In FIG. 1, the stereoscopic image editing apparatus 100 includes a storage section 101, a compression/decompression section 102, an operation section 103, a cropping and editing section 104, a crop-edit region correcting section 105, and a controller 106. The stereoscopic image editing apparatus 100 may further include an external interface 107. The stereoscopic image editing apparatus 100 is connected to a display unit 110. The display unit 110 includes a display 111 and a VRAM (Video Random Access Memory) 112.

The storage section 101 is, for example, a read only memory (ROM) or a random access memory (RAM), and stores therein a captured stereoscopic image. Further, when the stereoscopic image is played back, the storage section 101 temporarily stores therein the stereoscopic image, and stores an edited stereoscopic image which will be later described.

The compression/decompression section 102 is, for example, a codec, and decompresses a stereoscopic image, which has been compressed in a certain compression format, in a format displayable on a display. Also, the compression/decompression section 102 compresses the edited stereoscopic image in a certain compression format. Representative examples of the compression format of the stereoscopic image are JPEG format, GIF format, and PNG format, if the stereoscopic image is a still image. If the stereoscopic image is a moving image, the examples thereof are AVI format and MPEG format.

The operation section 103 is, for example, an input device, such as a keyboard and a mouse, and receives a content of an instruction from the user. Also, the operation section 103 may be an input device integral with a display 111 such as that represented by a touch panel display.

The cropping and editing section 104 crops and edits the stereoscopic image, based on the crop-edit region specified by the user via the operation section 103.

On the basis of a depth relative to a display screen, which is specified by the user via the operation section 103, the crop-edit region correcting section 105 corrects the crop-edit region in which the stereoscopic image is cropped and edited by the cropping and editing section 104.

The controller 106 is, for example, a central processing unit (CPU), and controls a process of each functional section of the stereoscopic image editing apparatus 100.

The display unit 110 includes the display 111 and the VRAM (Video Random Access Memory) 112. The display 111 displays the stereoscopic image stored by the storage section 101, and also displays the stereoscopic image edited by the user. The VRAM 112 is a buffer for displaying the stereoscopic image on the display 111. The display unit 110 may be incorporated in the stereoscopic image editing apparatus 100, or may be a display device connected to the stereoscopic image editing apparatus 100.

The external interface 107 is, for example, a universal serial bus (USB). The stereoscopic image editing apparatus 100 is connected to network and an external device via the external interface 107. The stereoscopic image editing apparatus 100 may acquire, via the external interface 107, external data from a camera and a storage medium, or the like which is external to the stereoscopic image editing apparatus 100, and stores the obtained external data in the storage section 101.

Figure 2:
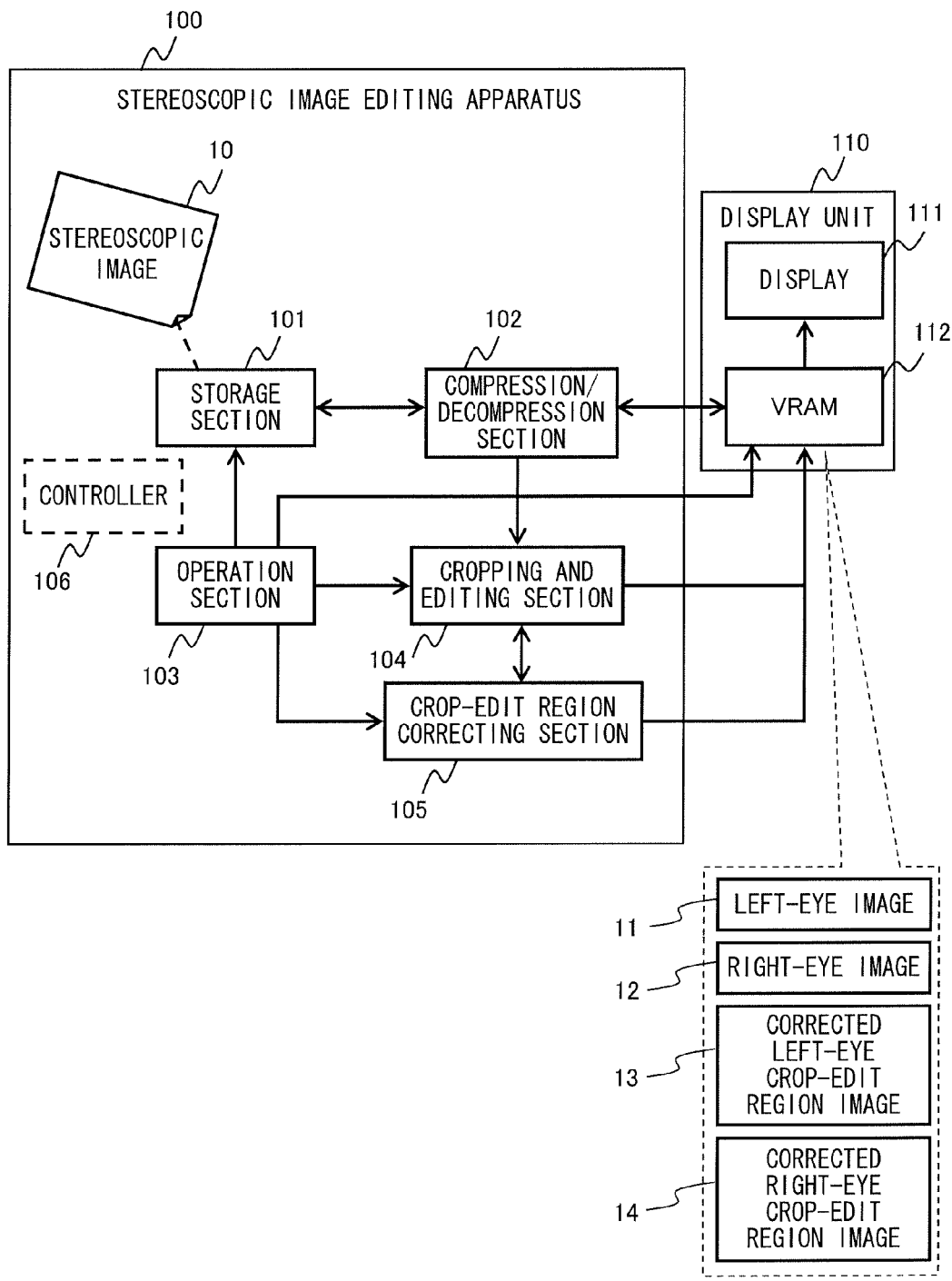
FIG. 2 is a block diagram showing a schematic configuration of the stereoscopic image editing apparatus 100 according to the first embodiment of the present invention.

FIG. 2 is a block diagram showing a schematic configuration of the stereoscopic image editing apparatus 100 according to the first embodiment of the present invention. In FIG. 2, the stereoscopic image editing apparatus 100 includes the storage section 101, the compression/decompression section 102, the operation section 103, the cropping and editing section 104, the crop-edit region correcting section 105, and the controller 106. The stereoscopic image editing apparatus 100 is connected to the display unit 110. Here, description is given in detail of each functional block of the stereoscopic image editing apparatus 100 having the hardware configuration shown in FIG. 1.

A captured stereoscopic image 10 is stored in the storage section 101. The stereoscopic image 10 is composed of a left-eye image 11, which is projected to the left eye alone of the user viewing the stereoscopic image 10, and a right-eye image 12, which is projected to the right eye of the user alone. Here, the stereoscopic image 10 is assumed to be a moving image compressed in MPEG format. The storage section 101 stores therein a cropped and edited stereoscopic image, which is composed of a corrected left-eye crop-edit region image 13, and a corrected right-eye crop-edit region image 14, which will be described later.

The user selects the stereoscopic image 10 stored by the storage section 101 as an image to be edited, via the operation section 103.

The compression/decompression section 102 decompresses the stereoscopic image 10, which has been compressed in MPEG format, in a format displayable on the display 111. The left-eye image 11 and the right-eye image 12 of the stereoscopic image 10 decompressed by the compression/decompression section 102 are displayed on the display 111, via the VRAM 112. Also, the compression/decompression section 102 compresses the edited stereoscopic image in MPEG format. The storage section 101 stores therein the edited stereoscopic image compressed in MPEG format.

The user specifies a crop-edit region of the left-eye image 11 and the right-eye image 12 of the stereoscopic image 10 which are displayed on the display 111, via the operation section 103.

On the basis of the crop-edit region specified by the user via the operation section 103, the cropping and editing section 104 crops and edits the left-eye image 11 and the right-eye image 12 of the stereoscopic image 10 which are displayed on the display 111.

The user further specifies, via the operation section 103, a depth, which is relative to display screen, of the left-eye image 11 and the right-eye image 12 of the stereoscopic image 10 which are cropped and edited by the cropping and editing section 104.

On the basis on the depth set by the user via the operation section 103, the crop-edit region correcting section 105 corrects the crop-edit region of the left-eye image 11 and the right-eye image 12, of the stereoscopic image 10, to be cropped and edited by the cropping and editing section 104. More specifically, on the basis of information on the crop-edit region, and a fiducial disparity, which is a disparity of the frame itself of the crop-edit region, and which is depth information relative to the display screen, the crop-edit region correcting section 105 corrects the crop-edit region of each of the left-eye image 11 and the right-eye image 12, such that each image corresponds to the fiducial disparity. Detailed description of the content of the correction will be given later.

The display 111 displays the left-eye image 11 and the right-eye image 12 of the stereoscopic image 10, and, with respect to the displayed left-eye image 11 and the displayed right-eye image 12 of the stereoscopic image 10, displays the crop-edit region specified by the user and crop-edit region corrected by the crop-edit region correcting section 105.

Although relationship between the controller 106 and each functional block is not shown, the controller 106 controls each functional block of the stereoscopic image editing apparatus 100 described above.

Figure 3:
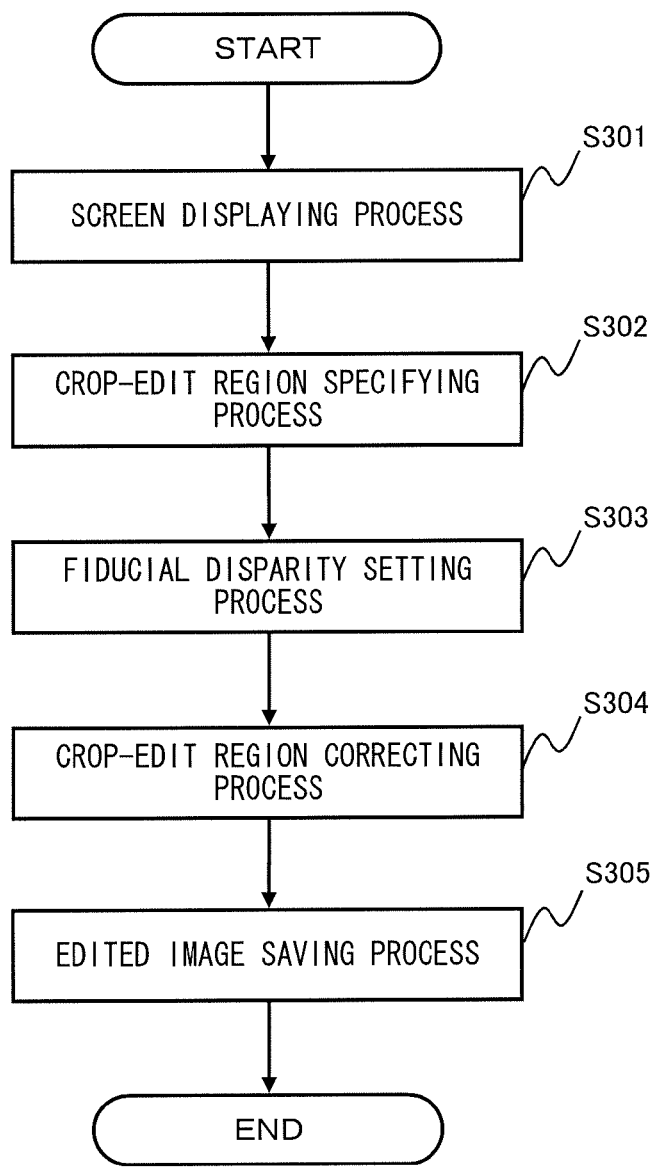
FIG. 3 is a flowchart showing a stereoscopic image editing method 300 according to the first embodiment of the present invention.

FIG. 3 is a flowchart showing a stereoscopic image editing method 300 according to the first embodiment of the present invention. In FIG. 3, the stereoscopic image editing method 300 includes a screen displaying step S301, a crop-edit region specifying step S302, a fiducial disparity setting step S303, a crop-edit region correcting step S304, and an edited image saving step S305.

In the screen displaying step S301, the display 111 displays the left-eye image 11 and the right-eye image 12 of the stereoscopic image 10. Specifically, the user selects, via the operation section 103, the stereoscopic image 10 stored by the storage section 101 as an image to be edited. The selected stereoscopic image 10 is read out from the storage section 101 to be decompressed by the compression/decompression section 102 so as to be in a format displayable on the display 111. The stereoscopic image 10 decompressed in the format displayable on the display 111 is then transferred to the VRAM 112, and the left-eye image 11 and the right-eye image 12 of the stereoscopic image 10 are displayed on the display 111.

Figure 4:
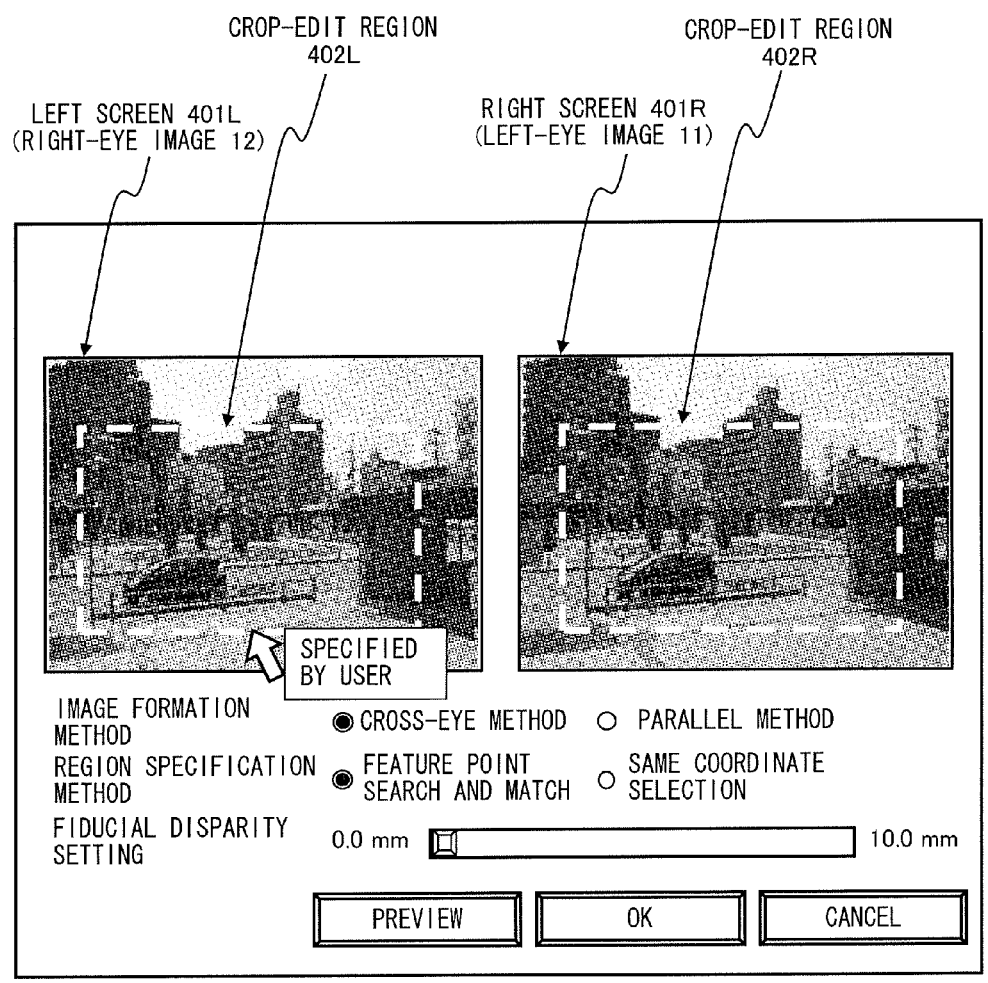
FIG. 4 is a diagram showing a configuration (crop-edit region specification) of an edit screen 400, of a stereoscopic image, according to the first embodiment of the present invention.

FIG. 4 is a diagram showing a configuration (crop-edit region specification) of an edit screen 400, of the stereoscopic image, according to the first embodiment of the present invention. In FIG. 4, the edit screen 400 of the stereoscopic image includes a left screen 401L and a right screen 401R which are for displaying images to be edited. There are a cross-eye method and a parallel method as an image formation method for a stereoscopic vision of the left-eye image 11 and the right-eye image 12 of the stereoscopic image 10. Here, it is assumed that the cross-eye method is employed ("CROSS-EYE METHOD" is selected in FIG. 4), the right-eye image 12 is displayed on the left screen 401L, and the left-eye image 11 is displayed on the right screen 401R. If the parallel method is employed, the left-eye image 11 is displayed on the left screen 401L, and the right-eye image 12 is displayed on the right screen 401R. The cross-eye method or the parallel method may be previously selected, or may be selected by the user via the operation section 103.

In the crop-edit region specifying step S302, the cropping and editing section 104 crops and edits the left-eye image 11 and the right-eye image 12 of the stereoscopic image 10 which are displayed on the display 111. Specifically, the user specifies the crop-edit region of the left-eye image 11 and the right-eye image 12 of the stereoscopic image 10 which are displayed on the display 111, via the operation section 103. As a simplified and general method of specifying the crop-edit region, the user moves a mouse cursor over the right-eye image 12 displayed on the left screen 401L or the left-eye image 11 displayed on the right screen 401R to determine one vertex angle of a rectangular region as a start point, and then determine opposite diagonal vertex angle as an end point. Determining the start point and the end point via the operation section 103 as described, the user specifies the rectangular region enclosed by the start point and the end point as the crop-edit region.

Further, as a method by which the user specifies the crop-edit region of the left-eye image 11 and the right-eye image 12, a feature point search and match method or a same coordinate selection method is employed, for example. Here, it is assumed that the feature point search and match method is employed ("FEATURE POINT SEARCH AND MATCH" is selected in FIG. 4), and the user specifies a crop-edit region 402L (indicated by a dashed line in FIG. 4) of the right-eye image 12 displayed on the left screen 401L. Therefore, a position having the same feature point with that in the crop-edit region 402L specified by the user is searched in the left-eye image 11 displayed on the right screen 401R by means of a stereo matching method, for example and thereby, the crop-edit region 402R (indicated by the dashed line in FIG. 4) is determined. The feature point search and match method or the same coordinate selection method may be previously selected or may be selected by the user via the operation section 103.

In the fiducial disparity setting step S303, the crop-edit region correcting section 105 sets the fiducial disparity for the crop-edit regions 402L and 402R specified by the crop-edit region specifying step S302. Specifically, the user sets, via the operation section 103, the fiducial disparity for the frame of the crop-edit region of the left-eye image 11 and right-eye image 12 of the stereoscopic image 10 which are displayed on the display 111. The fiducial disparity is a disparity, of the frame itself of the crop-edit region, which is depth information relative to the display screen.

Figure 5:
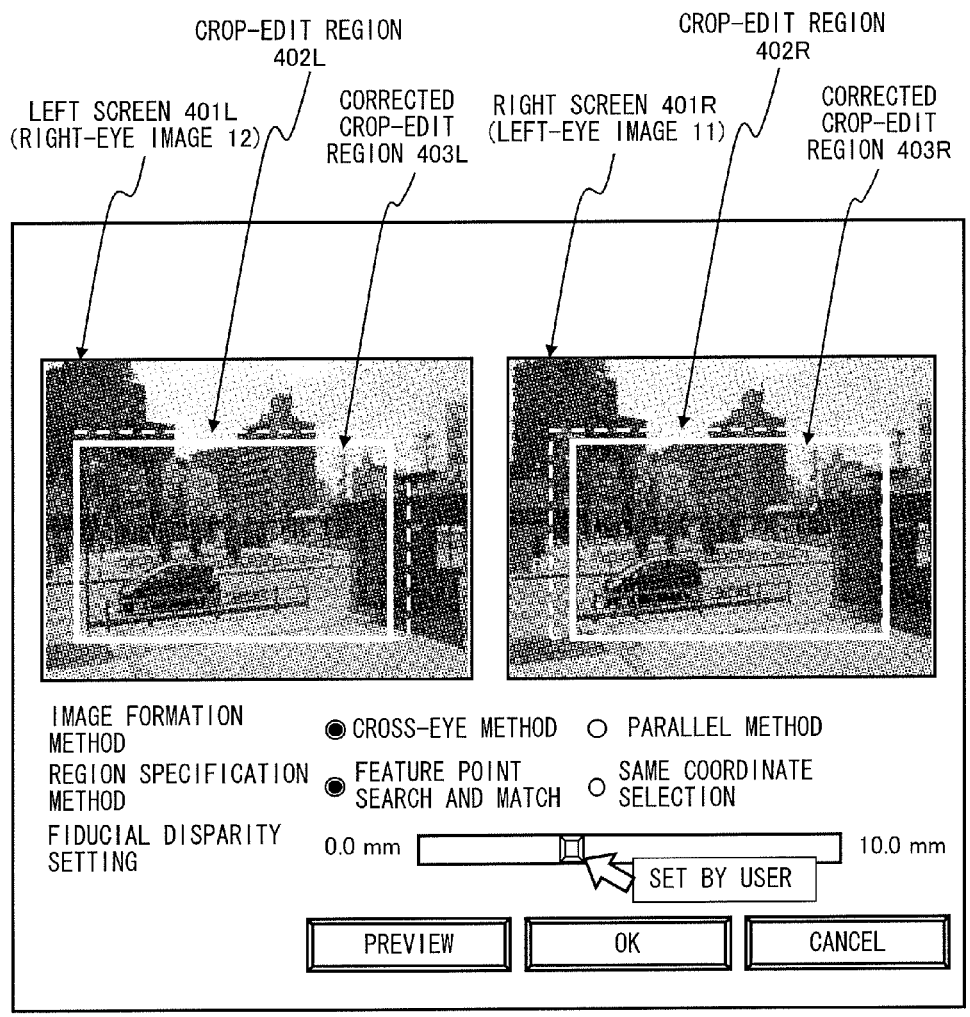
FIG. 5 is a diagram showing a configuration (fiducial disparity setting) of the edit screen 400, of the stereoscopic image, according to the first embodiment of the present invention.

FIG. 5 is a diagram showing a configuration (fiducial disparity setting) of the edit screen 400, of the stereoscopic image, according to the first embodiment of the present invention. As a method of setting the fiducial disparity, the user moves a mouse pointer over a fiducial disparity setting bar, which moves in a range between 0.0 mm and 10.0 mm, to set depth, of the cropped and edited stereoscopic images, relative to the display screen. For example, setting 0.0 mm to the fiducial disparity means that the crop-edit regions of the stereoscopic image 10 are set so that the disparity of the frame itself of the crop-edit regions become minimum. Setting 10.0 mm to the fiducial disparity means that the crop-edit regions of the stereoscopic image 10 are set so that the disparity of the frame itself of the crop-edit regions become maximum. Here, it is assumed that the user sets about 3.0 mm to the fiducial disparity as shown in FIG. 5.

The fiducial disparity that the user can set using the fiducial disparity setting bar is, but not limited to, the range between 0.0 mm and 10.0 mm. Also, a method of setting the fiducial disparity is not limited to the fiducial disparity setting bar as shown in FIG. 5. For example, the user may directly input a numerical value of the fiducial disparity via a ten-key of a keyboard, or the like.

In the crop-edit region correcting step S304, the crop-edit region correcting section 105 corrects, based on the fiducial disparity set in the fiducial disparity setting step S303, the crop-edit regions 402L and 402R, which are specified in the crop-edit region specifying step S302, of the respective left-eye image 11 and right-eye image 12, of the stereoscopic image 10, displayed on the display 111, so as to correspond to the fiducial disparity. Specifically, since 3.0 mm is set to the fiducial disparity, the crop-edit region correcting section 105 corrects the crop-edit regions 402L and 402R (indicated by the dashed lines in FIG. 5) of the respective left-eye image 11 and right-eye image 12 of the stereoscopic image 10, which are displayed on the display 111, to corrected crop-edit regions 403L and 403R (indicated by solid lines in FIG. 5), respectively, so as to correspond to the set fiducial disparity.

Figure 6:
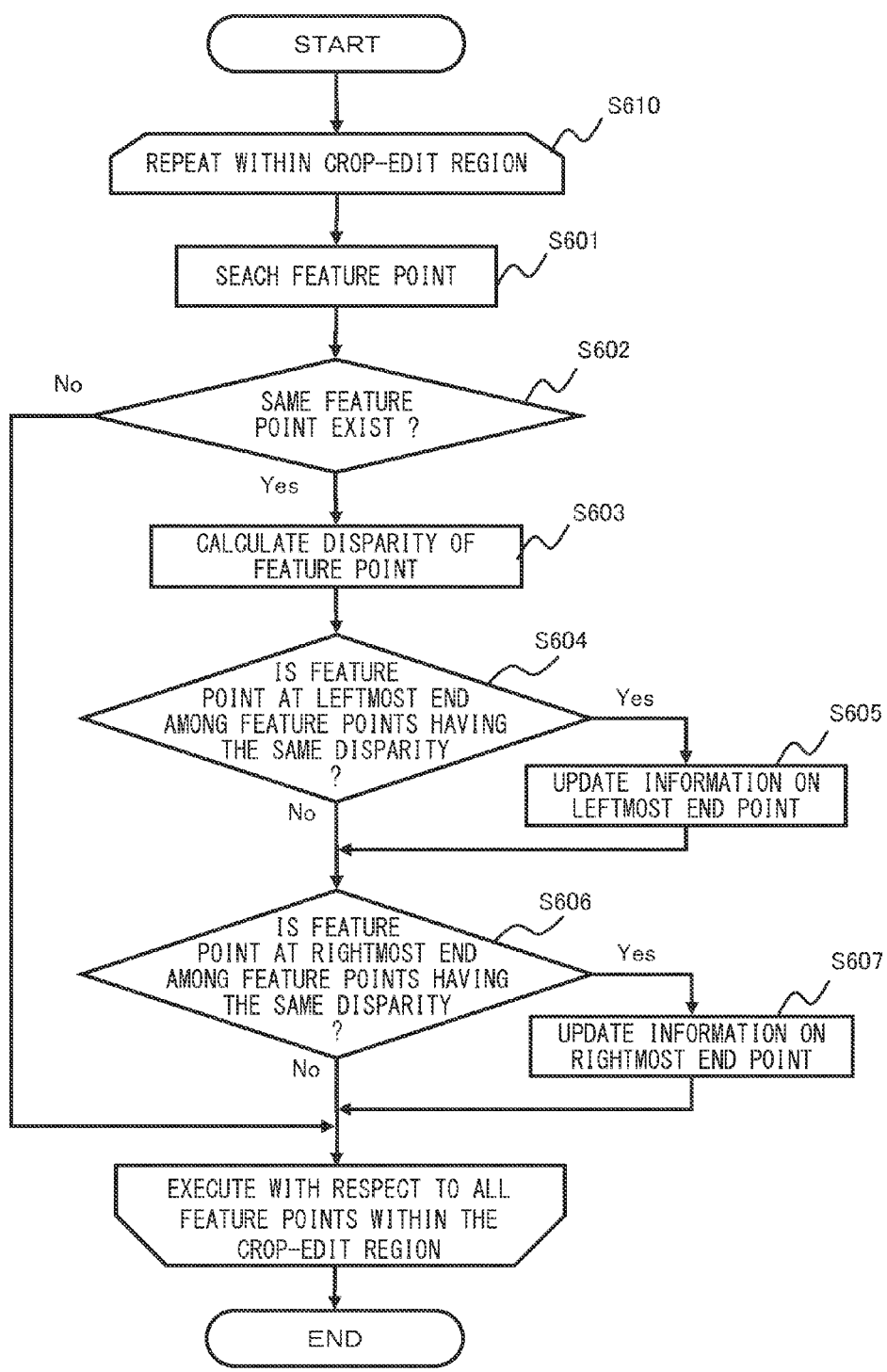
FIG. 6 is a flowchart showing a crop-edit region correction method 600 corresponding to the fiducial disparity.

FIG. 6 is a flowchart showing a crop-edit region correction method 600 corresponding to the fiducial disparity.

In step S601, given that an upper left end of each of the crop-edit regions 402L and 402R is a fiducial point, the crop-edit regions 402L and 402R, of the respective right-eye image 12 and left-eye image 11, which are specified in the crop-edit region specifying step S302, are each divided into predetermined unit areas. By means of calculation of area correlation, corresponding feature points are searched within the crop-edit regions 402L and 402R of the right-eye image 12 and the left-eye image 11, per the divided region. That is, positions of the same feature points within the crop-edit regions 402L and 402R are searched.

In step S602, if it is determined, for example, by means of the stereo matching method, that the same feature points exist within the crop-edit regions 402L and 402R of the right-eye image 12 and the left-eye image 11 (Yes in step S602), a disparity of the feature points is calculated (step S603). For example, it is possible to utilize, as a disparity, an amount in deviation in the horizontal direction between a relative position of an arbitrary feature point within the crop-edit region 402L of the right-eye image 12 and a relative position of the feature point within the crop-edit region 402R of the left-eye image 11. As an alternative method, the disparity of the feature points of the left and right eyes may be calculated by triangulation, with the assumption that the width between human eyes is 6.5 cm, which is its average value.

In step S604, it is determined whether the feature point among the feature points searched in step S602 is one at the leftmost end within each of the crop-edit regions 402L and 402R among the feature points which have the same disparity with each other. If the feature point among the feature points having the same disparity is the one at the leftmost end (Yes in step S604), coordinates of this feature point in each of the left-eye image and the right-eye image are saved in a memory or the like, as information of the leftmost end point corresponding to the disparity (step S605).

Similarly, in step S606, it is determined whether the feature point among the feature points searched in step S602 is one at the rightmost end within each of the crop-edit regions 402L and 402R among the feature points which have the same disparity with each other. If the feature point among the feature points having the same disparity is the one at the rightmost end (Yes in step S606), coordinates of this feature point in each of the left-eye image and the right-eye image are saved in a memory or the like, as information of the rightmost end point corresponding to the disparity (step S607).

If it is determined in step S602 that the same feature points do not exist within the crop-edit region 402L of the right-eye image 12 and the crop-edit region 402R of the left-eye image 11 (No in step S602), the above-described process steps S603 through S607 are not performed.

As described above, the process steps S601 through S607 are repeatedly executed with respect to all feature points within the crop-edit regions 402L and 402R (step S610).

Thus, the crop-edit region correcting section 105 saves in the memory or the like, the information of the leftmost end point and the rightmost end point, of each of the left-eye image and the right-eye image, within each of the crop-edit regions 402L and 402R, which correspond to the predetermined disparity. Therefore, a candidate crop-edit region correction table is generated.

FIG. 7 is a diagram showing a candidate crop-edit region correction table 700. In FIG. 7, the candidate crop-edit region correction table 700 holds the coordinates at the leftmost end and the coordinates at the rightmost end in each of the left-eye image and the right-eye image, which correspond to the predetermined disparity. Here, it is assumed, but not limited to, that the predetermined disparity is from 0.0 mm to following values each incremented by 1.0 mm therefrom and the coordinates to be held consist of an X coordinate and a Y coordinate. For example, the disparity may be precisely calculated in step S603, and therefore the interval between the predetermined disparities is shortened to less than 1.0 mm. Also, in the stereoscopic vision by binocular disparity, the disparity is affected merely by the horizontal direction and therefore, the coordinate to be held may be the X coordinate alone.

The crop-edit region correcting section 105 corrects the crop-edit regions 402L and 402R specified in the crop-edit region specifying step S302, based on the candidate crop-edit region correction table 700, so as to correspond to the fiducial disparity set in the fiducial disparity setting step S303. Specifically, the crop-edit region correcting section 105 corrects the crop-edit region 402L of the right-eye image 12 to the corrected crop-edit region 403L. Since 3.0 mm is set to the fiducial disparity, the corrected crop-edit region 403L is represented by the X coordinate of 70 for the leftmost end thereof and the X coordinate of 1770 for the rightmost end thereof, based on the candidate crop-edit region correction table 700. In addition, the crop-edit region correcting section 105 corrects the crop-edit region 402R of the left-eye image 11 to the corrected crop-edit region 403R. Since 3.0 mm is set to the fiducial disparity, the corrected crop-edit region 403R is represented by the X coordinate of 50 for the leftmost end thereof and the X coordinate of 1730 for the rightmost end thereof, based on the candidate crop-edit region correction table 700.

Although, in step S610, the process steps S601 through S607 described above are repeatedly executed with respect to all the feature points within the crop-edit regions 402L and 402R, the process steps are not necessarily to be executed with respect to all the feature points within the crop-edit regions 402L and 402R. The process steps S601 through S607 may be terminated at a time point when coordinates at the leftmost and the rightmost ends per disparity have been determined within each of the crop-edit regions 402L and 402R.

Although the crop-edit regions are corrected so as to correspond to the set fiducial disparity at the correction of the crop-edit regions, each of the crop-edit regions 402L and 402R of the respective left-eye image 11 and right-eye image 12 may be corrected, or one region (e.g., the crop-edit region 402L of the left-eye image 11) may be fixed while another region (the crop-edit region 402R of the right-eye image 12) alone is corrected.

Also, when the crop-edit region correcting section 105 corrects the crop-edit regions 402L and 402R to the corrected crop-edit regions 403L and 403R, respectively, based on the candidate crop-edit region correction table 700, there is a case where the size of the crop-edit regions 402L and 402R in the horizontal direction decreases. If the size merely in the horizontal direction of the crop-edit regions 402L and 402R specified by the user is corrected to be smaller, such a correction may end up with cropping and editing that are unintended by the user. Because of this, the size in the vertical direction also may be corrected in accordance with the correction of the size in the horizontal direction of the crop-edit regions 402L and 402R. That is, a ratio between the vertical length and the horizontal length of the crop-edit regions 402L and 402R may be maintained in the respective corrected crop-edit regions 403L and 403R specified by the user.

In the edited image saving step S305, the storage section 101 stores therein, as cropped and edited images, a corrected right-eye crop-edit region image 14 and a corrected left-eye crop-edit region image 13 which are obtained by cropping and editing in the corrected crop-edit regions 403L and 403R, respectively.

Figure 8:
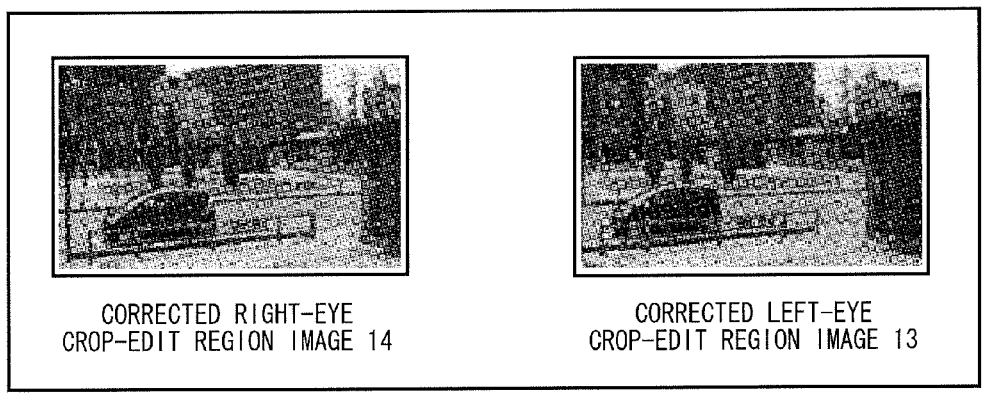
FIG. 8 is a diagram showing stereoscopic images cropped and edited in the corrected crop-edit region shown in FIG. 5.

FIG. 8 is a diagram showing stereoscopic images cropped and edited in the corrected crop-edit regions shown in FIG. 5. In FIG. 8, the cropped and edited stereoscopic image is composed of the corrected right-eye crop-edit region image 14 and the corrected left-eye crop-edit region image 13 cropped and edited in the corrected crop-edit regions 403L and 403R, respectively, as described above. The compression/decompression section 102 compresses the corrected right-eye crop-edit region image 14 and the corrected left-eye crop-edit region image 13 in MPEG format, and further, the storage section 101 stores therein the compressed corrected right-eye crop-edit region image 14 and the compressed corrected left-eye crop-edit region image 13. As described above, the cropped and edited stereoscopic image is generated.

A method may be used that saves the cropped and edited stereoscopic images, by associating the stereoscopic image 10 with the coordinate information of each of the corrected crop-edit regions 403L and 403R as meta data. Alternatively, a method may be used that processes the screen resolution itself of the stereoscopic image 10 so that the screen resolution becomes the corrected crop-edit regions 403L and 403R, compresses the stereoscopic image 10 by means of the compression/decompression section 102, and then saves the compressed stereoscopic image 10 in the storage section 101.

As described above, according to the stereoscopic image editing apparatus 100 and the stereoscopic image editing method 300 of the first embodiment of the present invention, by allowing the user to set the fiducial disparity, which is the disparity of the frame itself of the specified crop-edit region, the desired depth can be provided in the display area of the stereoscopic image and as a result, a stereoscopic image having a stereoscopic effect desired by the user can be obtained. The user can set for the specified crop-edit region the fiducial disparity, which is the disparity of the frame itself of the crop-edit region and therefore, a depth toward the back of the display screen can be provided in the image with the assumption that the frame of the crop-edit region specified by the user is frontmost relative to an image in the crop-edit region. Furthermore, a setting can be made to display the subject as if jumping out toward a front side relative to the frame of the crop-edit region, with the assumption that the frame of the crop-edit region specified by the user is farthest away relative to the display screen.

In the present embodiment, the stereoscopic image 10 is assumed, but not limited, to be a moving image compressed in MPEG format. For example, the compression format of the stereoscopic image 10 may be another compression format, such as AVI format or H.264 format. Also, the stereoscopic image 10 may be a still image and the compression format thereof may be JPEG format or the like, for example. The compression/decompression section 102 compresses or decompresses the stereoscopic image, depending on various compression formats.

The display 111 may display the crop-edit region specified by the user with respect to the left-eye image 11 and the right-eye image 12 of the stereoscopic image 10, and the crop-edit region corrected by the crop-edit region correcting section 105 so as to be superimposed on each other. Further, the display 111 may display the corrected right-eye crop-edit region image 14 and the corrected left-eye crop-edit region image 13, in which the respective crop-edit regions thereof are corrected. The display 111 may also preview the cropped and edited stereoscopic image composed of the corrected right-eye crop-edit region image 14 and the corrected left-eye crop-edit region image 13.

As shown in FIG. 4 and FIG. 5, the edit screen 400 of the stereoscopic image may include PREVIEW button, OK button, and CANCEL button. By operating PREVIEW button, OK button, and CANCEL button, the user can perform cropping and editing process on the stereoscopic image, while confirming the edit status of the stereoscopic image. Specifically, by pressing PREVIEW button, the user displays on the display for the confirmation the stereoscopic image composed of the corrected right-eye crop-edit region image 14 and the corrected left-eye crop-edit region image 13 which are based on the corrected crop-edit regions 403L and 403R. At the confirmation of the displayed stereoscopic image, if the user judges that the stereoscopic image has the stereoscopic effect desired by the user, the user presses OK button to save the corrected right-eye crop-edit region image 14 and the corrected left-eye crop-edit region image 13 in the storage section 101 as cropped and edited images. On the other hand, at the confirmation of the displayed stereoscopic image, if the user judges that the stereoscopic image does not have the stereoscopic effect desired by the user, the user presses CANCEL button to delete the corrected right-eye crop-edit region image 14 and the corrected left-eye crop-edit region image 13.

If the operation section 103 is a keyboard, a key (Enter key or the like) denoting determination and a key (ESC key or the like) denoting cancellation may be used instead of OK button and CANCEL button shown in FIG. 4 and FIG. 5, respectively.

As described above, the user can generate the stereoscopic image having the stereoscopic effect desired by the user, while confirming the cropped and edited stereoscopic image. The user may change the fiducial disparity to be set so as to be greater, if the user wishes to obtain the stereoscopic effect which provides the image with a depth toward the back of the display screen, with the assumption that the frame of the specified crop-edit region is more front relative to an image in the crop-edit region. Furthermore, the user may change the fiducial disparity to be set so as to be smaller if the user wishes to obtain the stereoscopic effect as if the subject is jumping out toward the front side relative to the frame of the crop-edit region, with the assumption that the frame of the crop-edit region specified by the user is farther away relative to the display screen.

That is, the user can generate the stereoscopic image having the stereoscopic effect desired by the user, without undergoing trial and error about the size of the crop-edit region and the location of the crop-edit region, but merely by changing the fiducial disparity to be set.

Also, even if the user changes the fiducial disparity over and over again, creating in advance the candidate crop-edit region correction table 700 shown in FIG. 7 allows efficient determination of the corrected crop-edit regions by referring to the candidate crop-edit region correction table 700.

Second Embodiment

The basic configuration of a stereoscopic image apparatus according to a second embodiment and a basic flow of a stereoscopic image method are the same as those of the first embodiment of the present invention. The second embodiment is different from the first embodiment of the present invention in a method where a user sets a fiducial disparity which is a disparity of a frame itself of a crop-edit region. Hereinafter, description is given of difference between the second embodiment and the first embodiment of the present invention.

Figure 9:
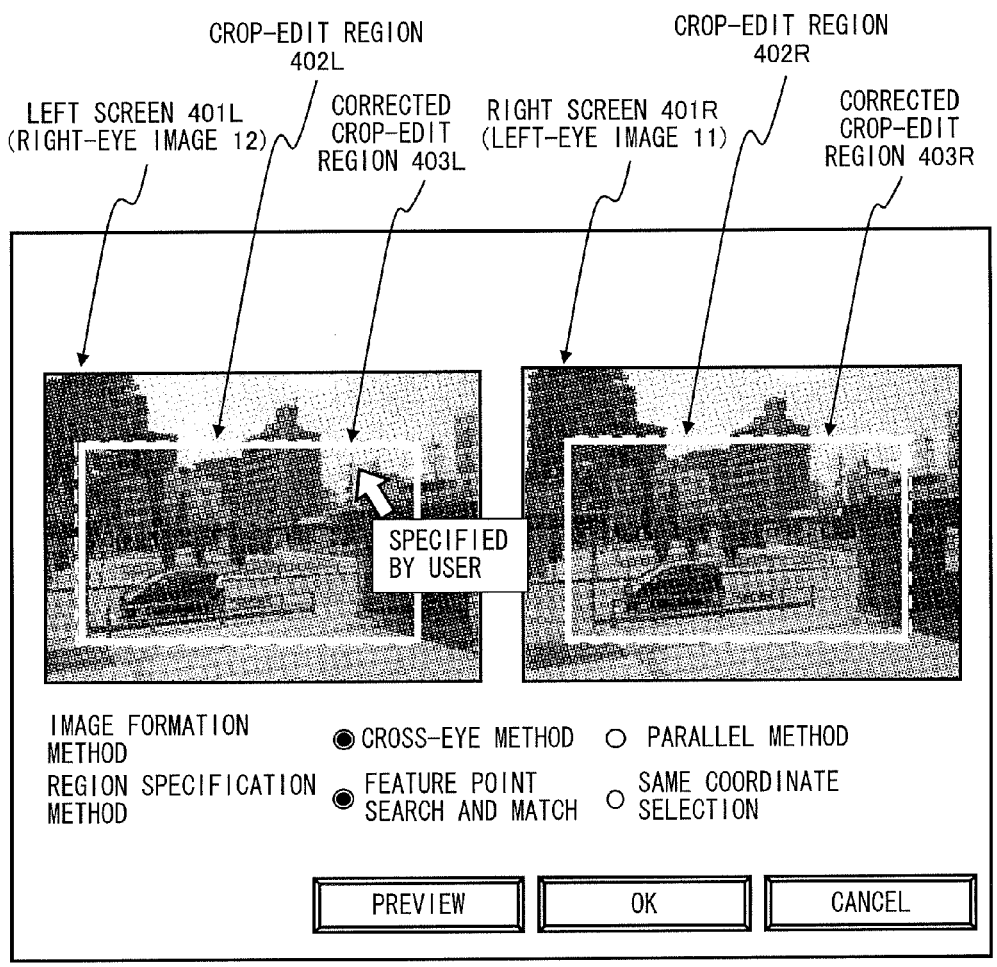
FIG. 9 is a diagram showing a configuration (minimal fiducial disparity setting) of an edit screen 410, of the stereoscopic image, according to a second embodiment of the present invention.

FIG. 9 is a diagram showing a configuration (minimal fiducial disparity setting) of an edit screen 410, of a stereoscopic image, according to the second embodiment of the present invention. The user sets, via an operation section 103, the fiducial disparity, which is the disparity of the frame itself of the crop-edit region, for the frame of the crop-edit region of a left-eye image 11 and a right-eye image 12, of a stereoscopic image 10, which are displayed on a display 111.

In a fiducial disparity setting step S303 shown in FIG. 3, a crop-edit region correcting section 105 sets the fiducial disparity for the crop-edit regions 402L and 402R specified in a crop-edit region specifying step S302. As shown in FIG. 5, as the method of setting the fiducial disparity in the first embodiment of the present invention, the user moves the mouse pointer over a fiducial disparity setting bar, which moves in a range between 0.0 mm and 10.0 mm, to set the depth, of the cropped and edited stereoscopic images, relative to a display screen.

In the present embodiment, a subject (feature point) present in the stereoscopic image is specified. Specifically, as shown in FIG. 9, the user moves the mouse pointer to specify a "building", which is a subject present in the farthest end relative to the display screen. Here, the disparity same as the disparity of the specified "building" is assumed to be the fiducial disparity, which is the disparity of the frame itself of the crop-edit region. Thereafter, in a crop-edit region correcting step S304, the crop-edit region correcting section 105 corrects crop-edit regions 402L and 402R (indicated by dashed lines in FIG. 9) to corrected crop-edit regions 403L and 403R (indicated by solid lines in FIG. 9), respectively, with the assumption that the disparity of the specified "building" to be the fiducial disparity, in the same manner as that of the first embodiment of the present invention.

FIG. 10 is a diagram showing the stereoscopic images cropped and edited in the corrected crop-edit regions shown in FIG. 9. In FIG. 10, the cropped and edited stereoscopic image is composed of a corrected right-eye crop-edit region image 14 and a corrected left-eye crop-edit region image 13 obtained by cropping and editing in the corrected crop-edit regions 403L and 403R as described above. A compression/decompression section 102 compresses the corrected right-eye crop-edit region image 14 and the corrected left-eye crop-edit region image 13 in MPEG format and further, a storage section 101 stores therein the compressed corrected right-eye crop-edit region image 14 and the compressed corrected left-eye crop-edit region image 13. As described above, the cropped and edited stereoscopic image is generated.

Figure 11:
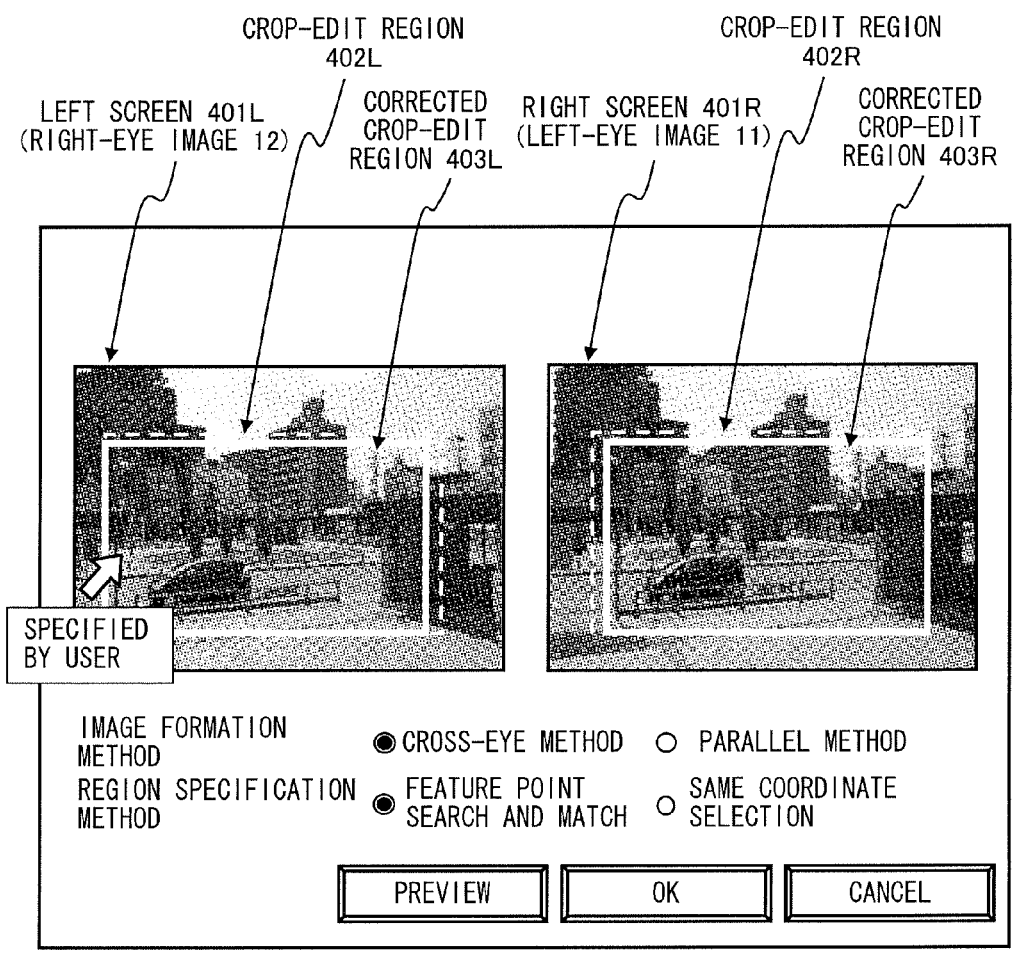
FIG. 11 is a diagram showing a configuration (maximal fiducial disparity setting) of the edit screen 411, of the stereoscopic image, according to the second embodiment of the present invention.

FIG. 11 is a diagram showing a configuration (maximal fiducial disparity setting) of an edit screen 411, of the stereoscopic image, according to the second embodiment of the present invention. As shown in FIG. 11, the user moves the mouse pointer to specify a "tree" which is a subject present frontmost relative to the display screen. Here, the disparity same as the disparity of the specified "tree" is assumed to be the fiducial disparity, which is the disparity of the frame itself of the crop-edit region. Thereafter, in a crop-edit region correcting step S304, the crop-edit region correcting section 105 corrects the crop-edit regions 402L and 402R (indicated by the dashed lines in FIG. 11) to the corrected crop-edit regions 403L and 403R (indicated by the solid line in FIG. 11), respectively, with the assumption that the disparity of the specified "building" is the fiducial disparity, in the same manner as that of the first embodiment of the present invention.

FIG. 12 is a diagram showing the stereoscopic images cropped and edited in corrected crop-edit region shown in FIG. 11. In FIG. 12, the cropped and edited stereoscopic image is composed of the corrected right-eye crop-edit region image 14 and the corrected left-eye crop-edit region image 13 obtained by cropping and editing in the corrected crop-edit regions 403L and 403R as described above. The compression/decompression section 102 compresses the corrected right-eye crop-edit region image 14 and the corrected left-eye crop-edit region image 13 in MPEG format and further, the storage section 101 stores therein the compressed corrected right-eye crop-edit region image 14 and the compressed corrected left-eye crop-edit region image 13. As described above, the cropped and edited stereoscopic image is generated.

The compression format of the stereoscopic image 10 is not limited to MPEG format, and may be another compression format, such as AVI format or H.264 format, for example. Also, the stereoscopic image 10 may be a still image and the compression format thereof may be JPEG format or the like, for example.

As described above, according to the stereoscopic image editing apparatus and the stereoscopic image editing method of the second embodiment of the present invention, by allowing the user to set the fiducial disparity, which is the disparity of the frame itself of the specified crop-edit region, the desired depth in the display area of the stereoscopic image can be provided and as a result, a stereoscopic image having a stereoscopic effect desired by the user can be obtained.

Further, according to the configurations of the edit screens 410 and 411, of the stereoscopic image, of the present invention of the second embodiment, the content creator is allowed to specify the subject (the feature point) present in the stereoscopic image when setting the fiducial disparity, and therefore the disparity of the frame itself of the crop-edit region of the stereoscopic image can be made to coincide with the disparity of the subject (the feature point) that the content creator wishes the content viewer to watch. Thus, particularly when the stereoscopic image is displayed in picture-in-picture mode, and when the content viewer moves his/her viewpoint from a main screen to a sub-screen, the viewpoint can be smoothly guided to the subject which is desired the content viewer to watch on the sub-screen.

A part or the whole of the functional blocks contained in each of the stereoscopic image editing apparatuses described in the first and second embodiments of the present invention is typically realized as an LSI (also called an IC (Integrated Circuit), a system LSI, a super LSI, an ultra LSI, or an ultra LSI, depending on the difference in the degree of integration). These functional blocks may be formed into one chip, or a part or the whole of the functional blocks may be included in one chip.

Furthermore, the method for circuit integration is not limited to the LSI, and may be realized through circuit-integration of a dedicated circuit or a general-purpose processor. An FPGA (Field Programmable Gate Array) that is capable of programming after manufacturing the LSI or a reconfigurable processor that is capable of reconstituting connections and configurations of a circuit cell within the LSI, may be used.

Further, if a circuit integration technology replacing the LSI technology is developed with an advance of semiconductor technology and other technologies deviated therefrom, it is needless to say that integration of the functional blocks may be performed by using the technology. Application of biotechnology or the like may be possible.

Functions of the stereoscopic image editing apparatus described in the first and second embodiments of the present invention each may be implemented by a CPU interpreting and executing predetermined program data, capable of executing the above-described process steps, stored in a storage apparatus (a ROM, a RAM, a hard disk, and the like). In this case, the program data may be introduced into the storage apparatus via a recording medium, or may be directly executed from the recording medium. Here, the recording medium includes: a semiconductor memory, such as a ROM, a RAM, and a flash memory; a magnetic disc memory, such as a flexible disk, and a hard disk; an optical disk, such as a CD-ROM, a DVD, and a BD; and a memory card, and the like. The recording medium is a concept including a communication medium, such as a telephone line, or a carrier path.

INDUSTRIAL APPLICABILITY

The present invention is useful for cropping and editing some region of a stereoscopic image composed of a left-eye image and a right-eye image. For example, the present invention is applicable to a case where some region of the stereoscopic image is enlarged for display, or where the some region of the stereoscopic image is displayed in picture-in-picture mode, superimposing on the main screen. Also, the present invention is applicable to a case where a plurality of images and/or a plurality of stereoscopic images are displayed in a layout being tiled, or the like.

DESCRIPTION OF THE REFERENCE CHARACTERS 10 stereoscopic image
11 left-eye image
12 right-eye image
13 corrected left-eye crop-edit region image
14 corrected right-eye crop-edit region image
100 stereoscopic image editing apparatus
101 storage section
102 compression/decompression section
103 operation section
104 cropping and editing section
105 crop-edit region correcting section
106 controller
107 external interface
110 display unit
111 display
112 VRAM
300 stereoscopic image editing method
400, 410, 411 stereoscopic image edit screen
401L left screen
401R right screen
402L left screen crop-edit region
402R right screen crop-edit region
403L corrected left screen crop-edit region
403R corrected right screen crop-edit region
600 crop-edit region correction method

The invention claimed is:

1. A stereoscopic image editing apparatus for editing a stereoscopic image composed of a left-eye image and a right-eye image displayed on a display into a stereoscopic image having a stereoscopic effect desired by a user, the stereoscopic image editing apparatus comprising:
    a storage section for storing therein the stereoscopic image;
    a compression/decompression section for converting the stereoscopic image stored by the storage section to a format displayable on the display;
    an operation section for allowing the user to specify a crop-edit region, and set a fiducial disparity, which is a disparity of a frame itself of the crop-edit region, with respect to the left-eye image and the right-eye image of the stereoscopic image which are displayed on the display;
    a cropping and editing section for cropping and editing the left-eye image and the right-eye image of the stereoscopic image which are displayed on the display, based on the crop-edit region specified by the user; and
    a crop-edit region correcting section for correcting the crop-edit region with respect to the cropped and edited left-eye image and the cropped and edited right-eye image, based on the fiducial disparity set by the user, wherein
    the operation section allows the user to specify a feature point within the crop-edit region with respect to the cropped and edited left-eye image and the cropped and edited right-eye image, and
    a disparity of the feature points is assumed to be the fiducial disparity.

2. The stereoscopic image editing apparatus according to claim 1, wherein
    the crop-edit region correcting section
        detects a feature point at a leftmost end and a feature point at a rightmost end from among feature points, within the crop-edit region, which have the same disparity as the fiducial disparity set by the user, and
        corrects a left end and a right end of the crop-edit region to a position of the detected feature point at the leftmost end and a position of the detected feature point at the rightmost end, respectively.

3. The stereoscopic image editing apparatus according to claim 1, wherein
    the crop-edit region correcting section
        detects, with respect to at least one or more predetermined disparities, a feature point at a leftmost end and a feature point at a rightmost end from among feature points, within the crop-edit region, which have the predetermined disparity,
        generates a candidate crop-edit region correction table in which the predetermined disparity is associated with a position of the detected feature point at the leftmost end, and a position of the detected feature point at the rightmost end, and
        corrects a left end and a right end of the crop-edit region to a position of the feature point at leftmost end and a position of the feature point at rightmost end, respectively, which are associated, in the candidate crop-edit region correction table, with the same disparity as the fiducial disparity set by the user.

4. A stereoscopic image editing method executed by a stereoscopic image editing apparatus for editing a stereoscopic image composed of a left-eye image and a right-eye image, which are displayed on a display, into a stereoscopic image having a stereoscopic effect desired by a user, the stereoscopic image editing method comprising:
    a compression/decompression step of converting a stereoscopic image, which is to be edited, into a format displayable on the display;

a crop-edit region specifying step of specifying a crop-edit region with respect to a left-eye image and a right-eye image of the stereoscopic image which are displayed on the display;

a cropping and editing step of cropping and editing the left-eye image and the right-eye image of the stereoscopic image which are displayed on the display, based on the specified crop-edit region;

a fiducial disparity setting step of setting, with respect to the cropped and edited left-eye image and the cropped and edited right-eye image, a fiducial disparity which is a disparity of a frame itself of the crop-edit region;

a crop-edit region correcting step of correcting the crop-edit region, based on the set fiducial disparity; and an edited image saving step of saving in the stereoscopic image editing apparatus the left-eye image and the right-eye image which have been cropped and edited in the corrected crop-edit region, wherein the fiducial disparity setting step allows the user to specify, with respect to the cropped and edited left-eye image and the cropped and edited right-eye image, a feature point within the crop-edit region, and a disparity of the feature points is assumed to be the fiducial disparity.

5. The stereoscopic image editing method according to claim 4, wherein the crop-edit region correcting step detects a feature point at a leftmost end and a feature point at a rightmost end from among feature points, within the crop-edit region, which have the same disparity as the set fiducial disparity, and corrects a left end and a right end of the crop-edit region to a position of the detected feature point at the leftmost end and a position of the detected feature point at the rightmost end, respectively.

6. The stereoscopic image editing method according to claim 4, wherein the crop-edit region correcting step detects, with respect to at least one or more predetermined disparities, a feature point at a leftmost end and a feature point at rightmost end from among feature points, within the crop-edit region, which have the predetermined disparity, generates a candidate crop-edit region correction table in which the predetermined disparity is associated with a position of the detected feature point at the leftmost end, and a position of the detected feature point at the rightmost end, and corrects a left end and a right end of the crop-edit region to a position of the feature point at the leftmost end and a position of the feature point at the rightmost end, respectively, which are associated, in the candidate crop-edit region correction table, with the same disparity as the set fiducial disparity.

7. A non-transitory computer-readable recording medium storing a stereoscopic image editing program for causing a computer to execute a stereoscopic image editing method for editing a stereoscopic image composed of a left-eye image and a right-eye image which are displayed on a display, into a stereoscopic image having a stereoscopic effect desired by a user, the stereoscopic image editing method comprising:

a compression/decompression step of converting a stereoscopic image, which is to be edited, into a format displayable on the display;

a crop-edit region specifying step of specifying a crop-edit region with respect to a left-eye image and a right-eye image of the stereoscopic image which are displayed on the display;

a cropping and editing step of cropping and editing the left-eye image and the right-eye image of the stereoscopic image which are displayed on the display, based on the specified crop-edit region;

a fiducial disparity setting step of setting, with respect to the cropped and edited left-eye image and the cropped and edited right-eye image, a fiducial disparity which is a disparity of a frame itself of the crop-edit region;

a crop-edit region correcting step of correcting the crop-edit region, based on the set fiducial disparity; and an edited image saving step of saving in the stereoscopic image editing apparatus the left-eye image and the right-eye image which have been cropped and edited in the corrected crop-edit region, wherein the fiducial disparity setting step allows the user to specify, with respect to the cropped and edited left-eye image and the cropped and edited right-eye image, a feature point within the crop-edit region, and a disparity of the feature points is assumed to be the fiducial disparity.

* * * * *